United States Patent [19]

Pham et al.

[11] Patent Number: 5,571,990
[45] Date of Patent: Nov. 5, 1996

[54] GAS-INSULATED SINGLE-PHASE CABLE FOR TRANSPORTING ELECTRICITY

[75] Inventors: Van Doan Pham, Meyzieu; René Tixier, Lyons, both of France

[73] Assignee: GEC Alsthom T & D SA, Paris, France

[21] Appl. No.: 360,008

[22] Filed: Dec. 20, 1994

[30] Foreign Application Priority Data

Dec. 21, 1993 [FR] France .................................. 93 15356

[51] Int. Cl.$^6$ ..................................................... H02G 5/06
[52] U.S. Cl. .............................. 174/24; 174/28; 174/68.2; 174/99 B
[58] Field of Search ............................... 174/24, 28, 15.6, 174/16.2, 68.2, 99 B

[56] References Cited

U.S. PATENT DOCUMENTS

| | | | |
|---|---|---|---|
| 3,646,245 | 2/1972 | Swerdlow | 174/21 JS |
| 3,652,778 | 3/1972 | Sakai | 174/28 |
| 3,792,220 | 2/1974 | Yoshioka et al. | 200/163 X |
| 4,161,621 | 7/1979 | Bolin et al. | 174/14 R |
| 4,316,052 | 2/1982 | Matsuda | 174/14 R X |
| 4,458,100 | 7/1984 | Cookson et al. | 174/28 |
| 5,089,665 | 2/1992 | Thuries | 174/27 |

FOREIGN PATENT DOCUMENTS

| | | |
|---|---|---|
| 0281323 | 9/1988 | European Pat. Off. . |
| 0423665 | 4/1991 | European Pat. Off. ............... 174/27 |
| 0573338 | 12/1993 | European Pat. Off. . |
| 2132646 | 11/1972 | France ........................... 174/99 B |
| 2244240 | 4/1975 | France ............................... 174/28 |
| 2642578 | 8/1990 | France . |
| 7036895 | 9/1970 | Germany . |
| 2313749 | 8/1974 | Germany . |
| 2429158 | 1/1976 | Germany . |

Primary Examiner—Kristine L. Kincaid
Assistant Examiner—Chau N. Nguyen
Attorney, Agent, or Firm—Sughrue, Mion, Zinn, Macpeak & Seas

[57] ABSTRACT

A gas-insulated single-phase cable for long-distance transport of electricity under high tension, the cable including a cylindrical steel case filled with nitrogen under a pressure of at least 10 hectopascals, an aluminum- or copper-based metal conductor held axially inside the steel case by closed insulating cones, and an aluminum case disposed at a short distance from the steel case and constituting a magnetic screen protecting the steel case from the magnetic field generated by the current carried by the conductor. The steel case is separated from the aluminum case by rings of plastics material or of filled polymer, such as polytetrafluoroethylene. Each rings is placed in a groove in a metal collar, with two adjacent portions of the aluminum case being welded to the collar.

6 Claims, 7 Drawing Sheets

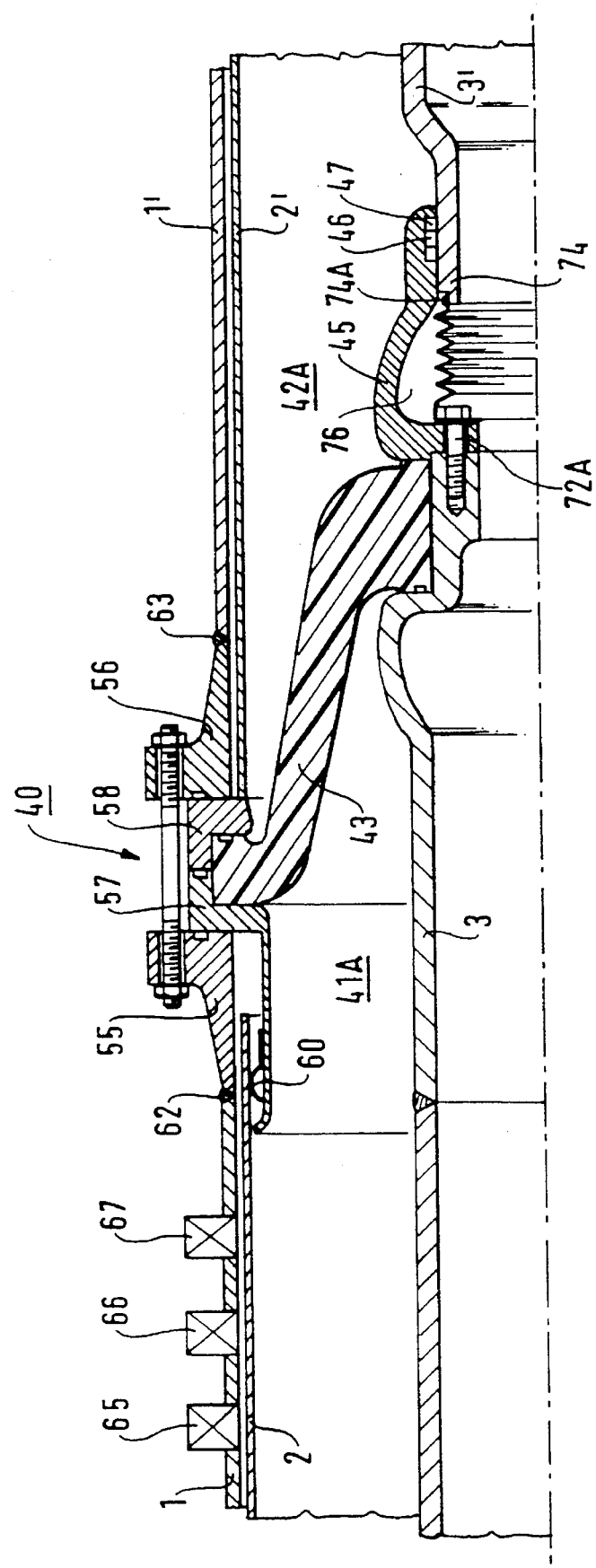

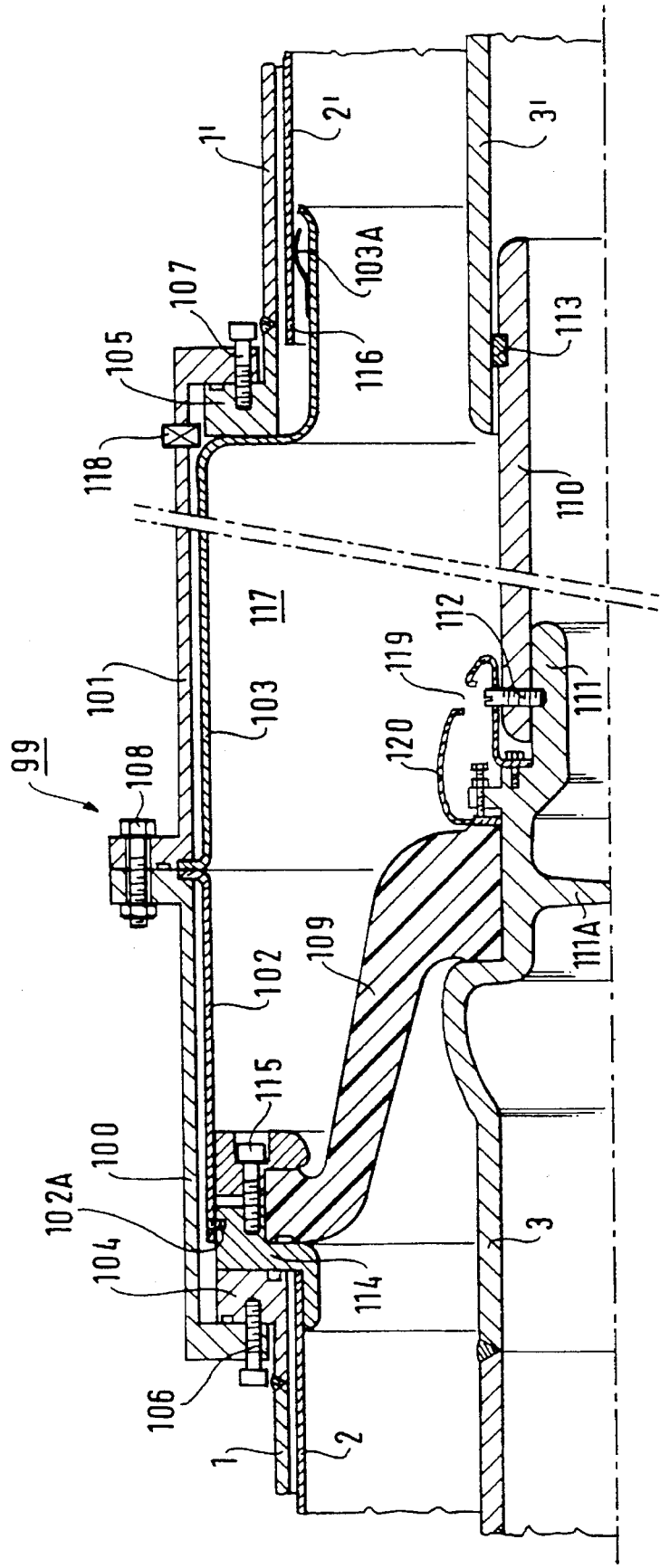

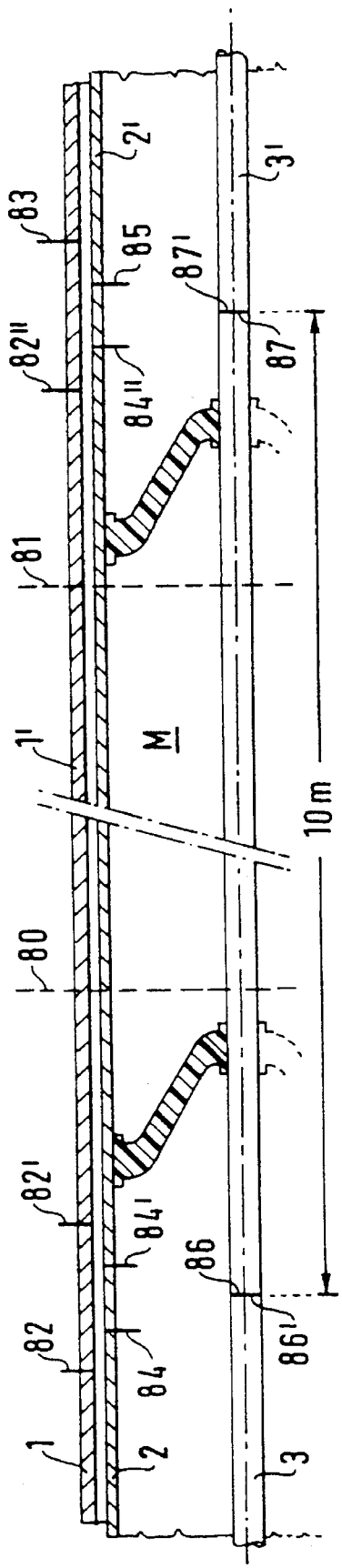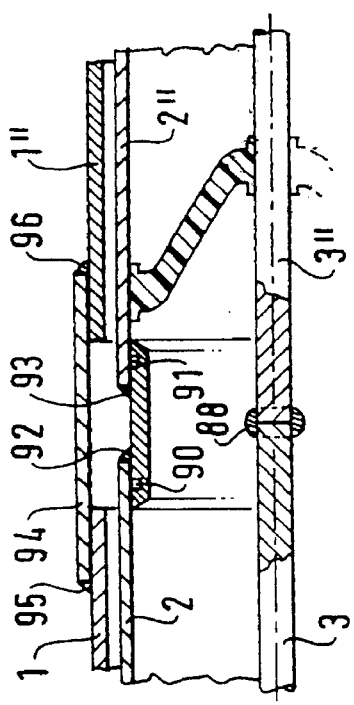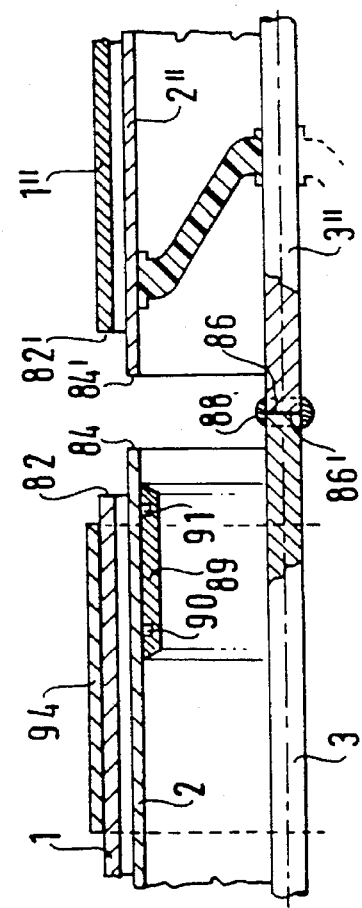

GAS-INSULATED SINGLE-PHASE CABLE FOR TRANSPORTING ELECTRICITY

The present invention relates to transporting electricity by means of a gas-insulated cable operating at high tension, i.e. at a voltage equal to or greater than 245 kV.

BACKGROUND OF THE INVENTION

Most cables insulated by sulfur hexafluoride ($SF_6$) that have been made in the past are single-phase cables (see in particular the Journal Electra, No. 94, 1984). A three-phase line is thus built up from three or four single-phase cables.

The main advantage is as follows: in the event of a line fault, the fault is necessarily a single-phase fault and applies to one only of the conductors, and it cannot propagate to the other conductors. There is therefore only one conductor that needs to be repaired, which is quicker, simpler, and less expensive than repairing a three-phase cable. When a line has four conductors, the fourth conductor is in reserve, and the grid can be brought back into service even more quickly since it suffices to switch the faulty phase over to the fourth conductor. The damaged phase can then be repaired in reasonable time without particular urgency.

The disadvantages of lines comprising a plurality of single-phase cables are the following:

higher resistive losses;

higher cost; and uses a larger area of ground.

OBJECTS AND SUMMARY OF THE INVENTION

An object of the present invention is to provide a single-phase transport cable of cost and maintenance price that are as low as possible.

For long distance lines, it is preferable to use nitrogen as the insulating gas, with nitrogen giving the same insulating power at a pressure of 12 hectopascals as $SF_6$ gives at a pressure of 4 hectopascals.

For example, with 420 kV high-tension lines, in which a short circuit current may often be as much as 63 kA, it is preferable for the cable to have a case that is made of steel in order to ensure that the cable is not punctured. A steel case having a thickness of 10 mm suffices, whereas if the case were to be made of aluminum, it would be necessary for the aluminum to be at least 30 mm thick.

Use of steel for the outer case provides well known advantages:

it is easy to make a case of great length by welding together elements that are 8 meters to 12 meters long, since the welding technique is easy to perform and is thoroughly mastered, particularly for the purpose of constructing pipe-lines for oil or gas; and techniques for providing protection against corrosion are likewise thoroughly mastered.

To avoid the steel being heated by magnetic field variations, it is necessary to provide a magnetic screen that is made of aluminum in the form of a tube that is about 8 mm thick and that is disposed inside the steel case.

The inner aluminum case is separated from the outer steel case by strips or layers or rings of a plastics material or a filled polymer such as polytetrafluoroethylene known under the trademark TEFLON. The TEFLON resin is preferably filled so as to have adequate density while still retaining a low coefficient of friction.

The aluminum inner case is made by welding together tubular elements via connection rings likewise made of aluminum, the tubular elements being of the same length as the steel elements from which the outer case is built up.

The conductors which are made of aluminum or of copper are likewise made up of welded-together elements.

They are held axially by means of closed cones of an insulating material such as epoxy resin. They may optionally slide relative to the aluminum case.

The closed insulating cones are spaced apart at intervals lying in the range 8 meters to 12 meters and they make it possible, in the event of a fault, to prevent dust and metal particles propagating.

A single-phase electricity line is built up cheaply by making compartments in a factory, each compartment comprising a steel casing element, an aluminum casing element, one insulating cone, and a conductor.

Some number of compartments are welded together end-to-end, e.g. 10 to 15 compartments so as to build up a length of line that is 80 meters to 180 meters long.

At the end of such a length of line, a compartment of larger diameter is provided that includes, in particular, a gas-tight insulating cone, valves for filling and for venting gas, and sliding electrical contacts to enable the conductors to expand without giving rise to lateral deformation.

Such lengths are grouped together into sectors having a length of 1000 meters to 1500 meters which are connected together via dismountable connection compartments.

The present invention provides a gas-insulated single-phase cable for long-distance transport of electricity under high tension, the cable comprising a cylindrical steel case filled with nitrogen under a pressure of at least 10 hectopascals, an aluminum- or copper-based metal conductor held axially inside the steel case by closed insulating cones, and an aluminum case disposed at a short distance from the steel case and constituting a magnetic screen protecting the steel case from the magnetic field generated by the current carried by the conductor, said steel case being separated from said aluminum case by rings of plastics material or of filled polymer, such as polytetrafluoroethylene, wherein each of said rings is placed in a groove in a metal collar, with two adjacent portions of the aluminum case being welded to said collar.

BRIEF DESCRIPTION OF THE DRAWINGS

The invention is now explained in detail with reference to the accompanying drawings, in which:

FIG. 6 shows a variant implementation of the FIG. 5 compartment;

FIG. 7 is an axial section view through a coupling compartment for two cabled sectors that is itself suitable for being dismounted; and FIGS. 8A to 8C show how a damaged compartment can be replaced.

MORE DETAILED DESCRIPTION

Figure 1:
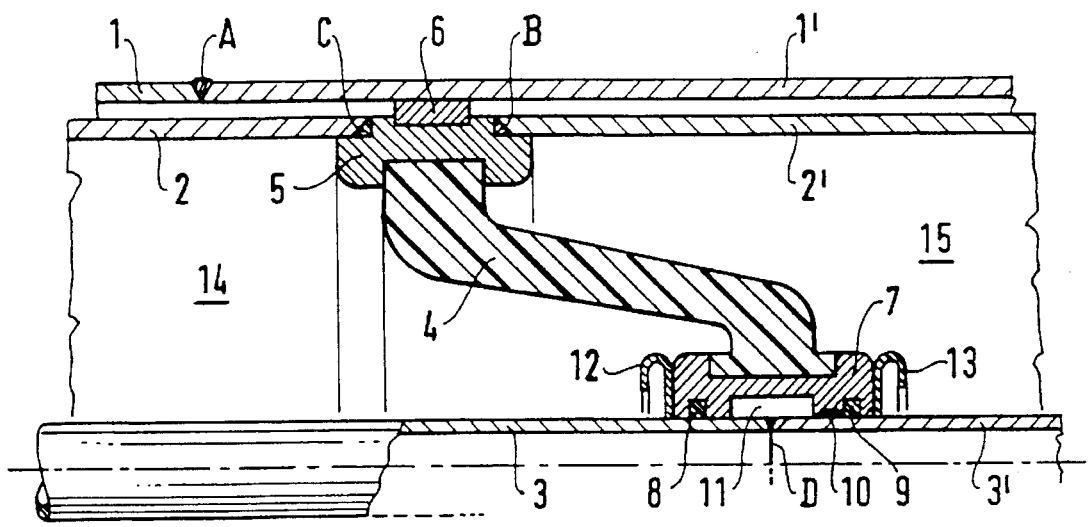
FIG. 1 is an axial half-section through a single-phase cable constituting a first embodiment of the invention.

In FIG. 1 reference numbers 1 and 1' designate the steel cases of two adjacent compartments; the steel cases are welded together at A.

Reference numbers 2 and 2' designate the inner aluminum cases that are welded at B and C to a metal collar 5 that includes a groove in which one end of a closed insulating cone 4 is engaged. A Teflon ring or band 6 is received in a groove of the collar 5 and serves to hold the steel case apart from the aluminum case, and to allow the aluminum case to slide inside the steel case during differential expansion and during assembly.

The closed insulating cone 4 may be mounted on the collar 5 or it may be inserted in the collar 5, in which case the collar is made in two portions.

Reference numbers 3 and 3' designate two conductor elements that are preferably tubular, that are made of aluminum or of copper, that are welded together at D, and that are engaged in an axial opening of the insulating cone, through which they are capable of sliding.

The axial opening of the cone is provided with a metal sleeve 7 that includes two anti-dust gaskets 8 and 9 disposed on either side of an electrical contact 10. The sleeve has a recess 11 between the gaskets 8 and 9.

Anti-corona rings 12 and 13 finish off the structure.

Dust generated by the sleeve 7 and the electrical contact 10 rubbing against the conductor 3–3' is held captive in the recess 11 by the gaskets 8 and 9. It will be observed that the weld line D between the conductor elements 3 and 3' lies within the recess 11.

The spaces 14 and 15 on either side of the insulating cone 4 are filled with gas at the same pressure since although the cone 4 is dust-tight, it is not gas-tight.

Figure 2:
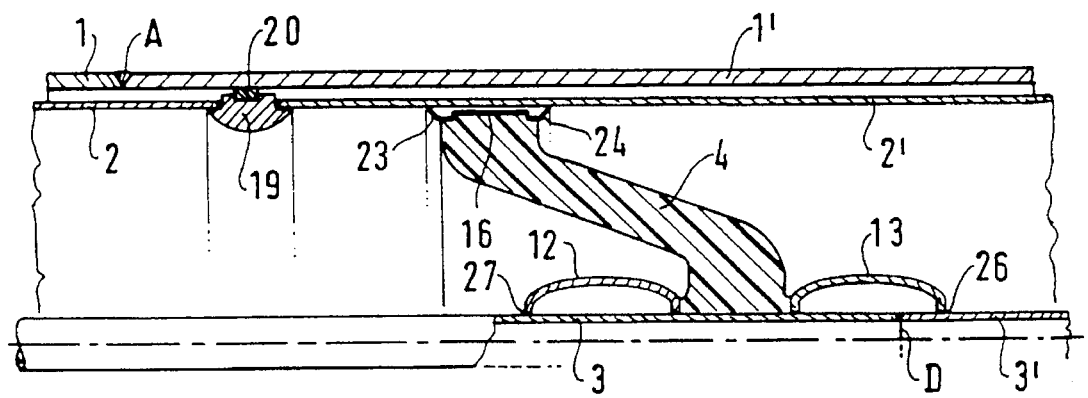
FIG. 2 is an axial half-section through a single-phase cable constituting a variant embodiment.
Figure 2A:
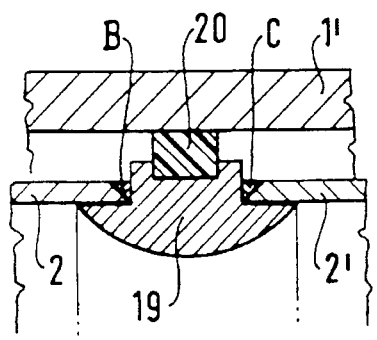
FIGS. 2A and 2B are views on a larger scale showing certain portions of FIG. 2.
Figure 2B:
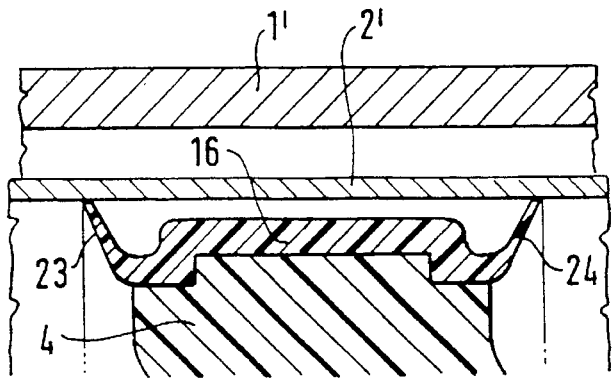

FIG. 2 shows a variant in which the insulating cone 4 is no longer secured to the aluminum cases 2 and 2'. The recess 11 has been omitted. The cone is secured to the conductors 3 and 3' by welding at 26 and at 27 between the conductors and the anti-corona screens 12 and 13. The weld line D between the conductor elements lies inside one of the anti-corona screens.

The base of the cone 4 bears against the aluminum case via a TEFLON resin gasket 16 provided with two skirts 23 and 24 that ensure sealing against dust between the compartments on either side of the cone.

The aluminum case elements are welded at B and C to a metal ring 19 which carries a TEFLON resin ring 20 in a groove for the purpose of ensuring that the spacing between the steel case and the aluminum case is maintained, and to facilitate relative sliding of said cases in the event of differential expansion.

The line is built up very simply, as follows:

A collar 19 is welded at B to an aluminum case element 2, and a conductor element 3 is welded at 27 to the anti-corona screen 12. A conductor element 3' is welded at D to conductor element 3. The insulating cone is then installed, together with the anti-corona screen 13 which is welded at 26 to the conductor element 3'. An aluminum case element is slid over the conductor element 3' and pushed home until contact is made at C against the ring 19. Element 2' is welded to the ring 19 at C. The ring 19 prevents weld particles from penetrating into the space 14. A steel case element 1' is slid over 2' and then pushed home until it comes into abutment at A against the steel case element 1. The case elements 1 and 1' are welded together at A. The operation is repeated several times (e.g. 10 times to 15 times) until a length of line having the desired length has been built up, e.g. a length of 100 meters. Every 100 meters, it is necessary to provide a connection compartment between line lengths so as to allow the various elements to expand freely without deforming in any way other than axially.

Figure 3:
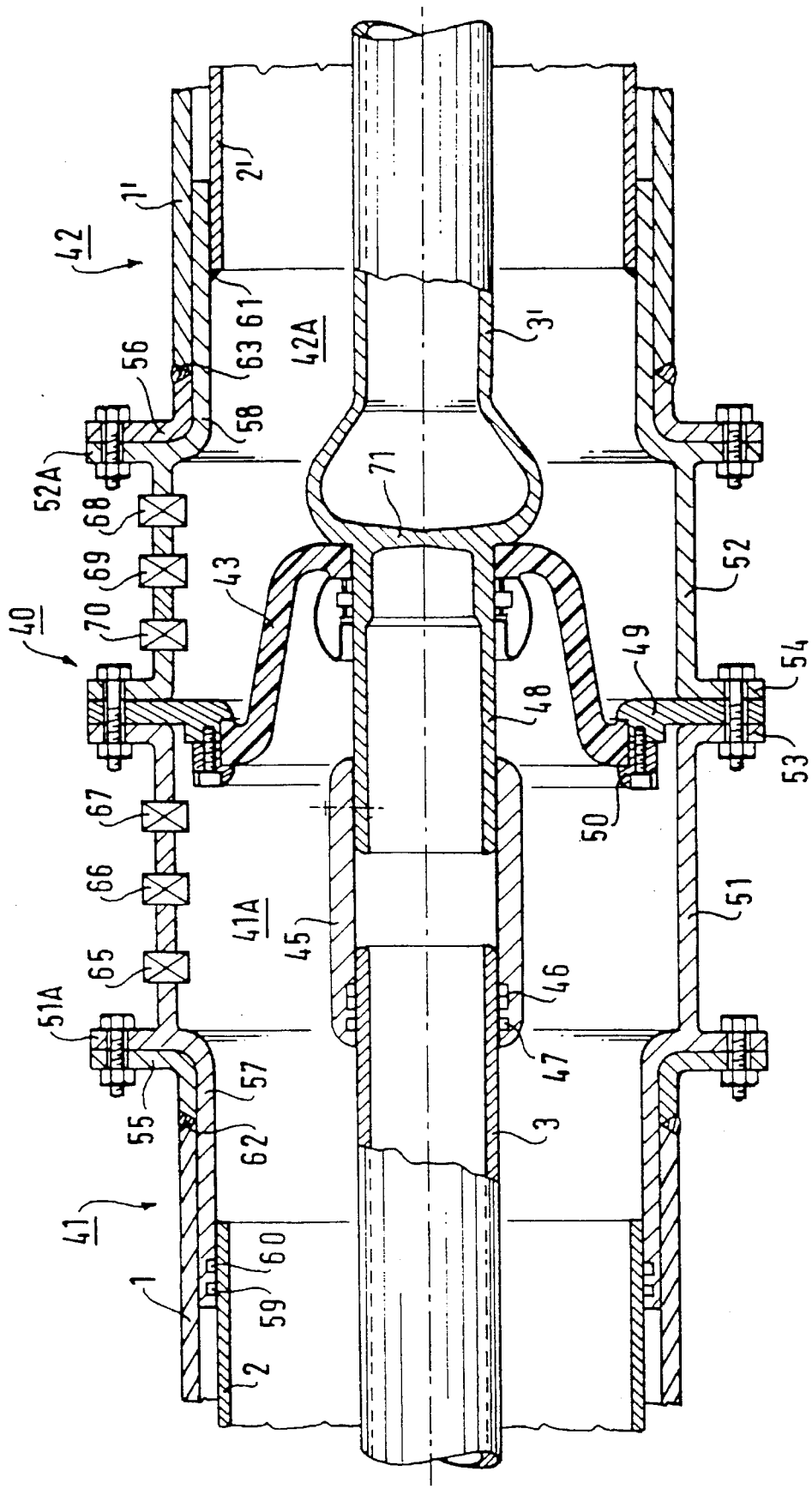
FIG. 3 is an axial section view through a compartment for coupling two lengths of electricity line together, and constituting a first embodiment thereof.

FIG. 3 shows one such connection compartment 40 between the end of one line length and the end of an adjacent line length.

Reference numbers 1, 2, and 3 respectively designate the steel case, the aluminum case, and the conductor of the lefthand length 41, whereas reference numbers 1', 2', and 3' designate corresponding elements for the righthand length 42.

The conductor 3' is extended by a metal tube 48 carrying a contact-carrier sleeve 45. The conductor 3 is in electrical connection with the tube 48 by means of the sleeve 45 that is provided with a sliding electrical contact 46 and with an anti-dusk gasket 47. A space is left between the end of the conductor 3 and the end of the tube 48 so as to leave them room to expand.

The tube 48 is secured to a cone 43 which is held in place by a plate 49 made of aluminum alloy, and by a ring 50. The plate 49 is clamped between flanges 53 and 54 of two tubular portions 51 and 52 made of aluminum. The end 57 opposite the flange 53 of the tubular portion 51 is engaged between the steel case 1 and the aluminum case 2. In the event of differential expansion, the free end of the aluminum case can slide inside the portion 57 which is provided with a sliding electric contact 59 and with an anti-dust gasket 60. The tubular portion 51 is provided with a flange 51A enabling it to be fixed by means of bolts to a flange 55 at the end of the steel case 1.

The end 58 opposite from the flange 54 of the tubular portion 52 is engaged between the steel case 1' and the aluminum case 2'. It is welded to the aluminum case at 61. It will be observed that the aluminum case 2, 2' is fixed at one end of the length of line and is left free at the other end thereof so as to accommodate thermal expansion. The tubular portion 52 is provided with a flange 52A enabling it to be fixed to a flange 56 placed at the end of the steel case 1'.

It will be observed that the tube 48 is provided with an endplate 71 such that the inside volumes 41A and 42A of the lengths 41 and 42 are totally separated from each other, with such sealing being further ensured by gaskets placed at appropriate locations.

Gas-filling valves 65 and 68, gas-venting valves 66 and 69, and sensors together with optional outlets for optical fibers 67 and 70, e.g. for the purpose of detecting internal arcing, are all mounted on the tubular portions 51 and 52.

Figure 4:
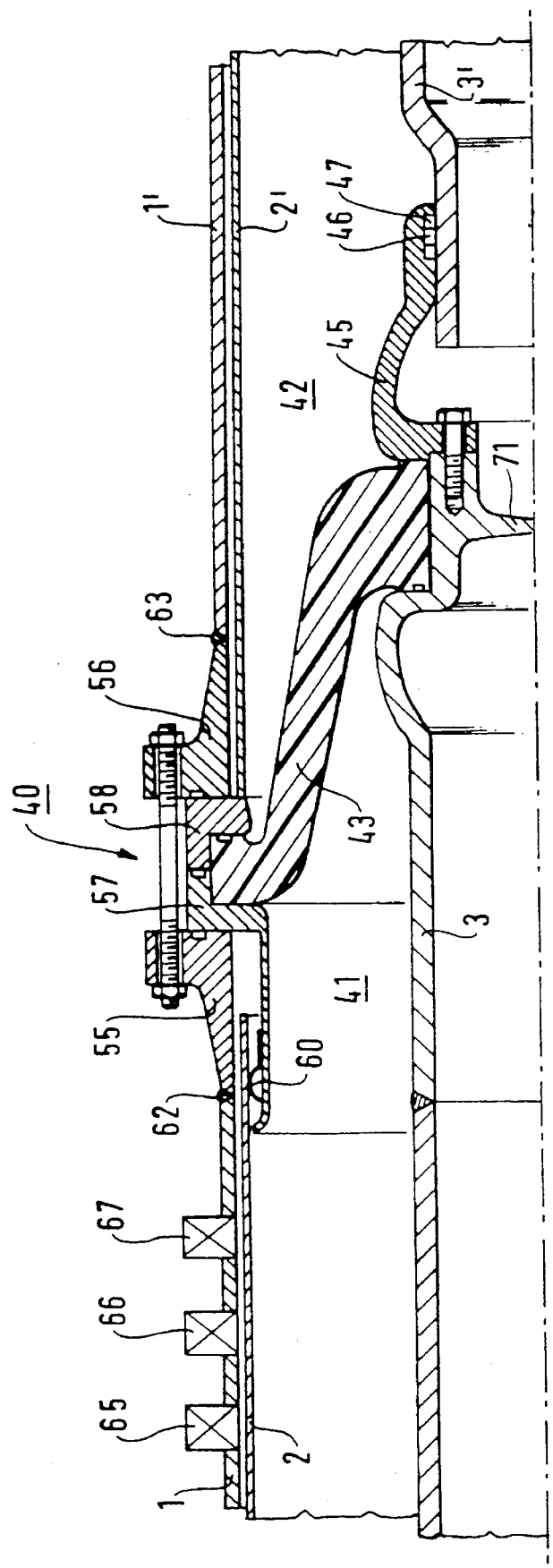
FIG. 4 shows a variant embodiment of the coupling compartment shown in FIG. 3.

FIG. 4 shows a variant embodiment of the FIG. 3 compartment and items that are common to both figures are given the same reference numerals. The main difference lies in the parts being simpler in shape. The plate 49 is omitted, with sealing between the two compartments 41A and 42A being provided by the end wall 71 which is now situated on the conductor 3, and by the cone 43 whose base is clamped directly between the flanges 57 and 58 which are provided with gaskets.

Valves 65 and 66 and sensor outlets 67 are applied to the steel case 1.

Figure 5:
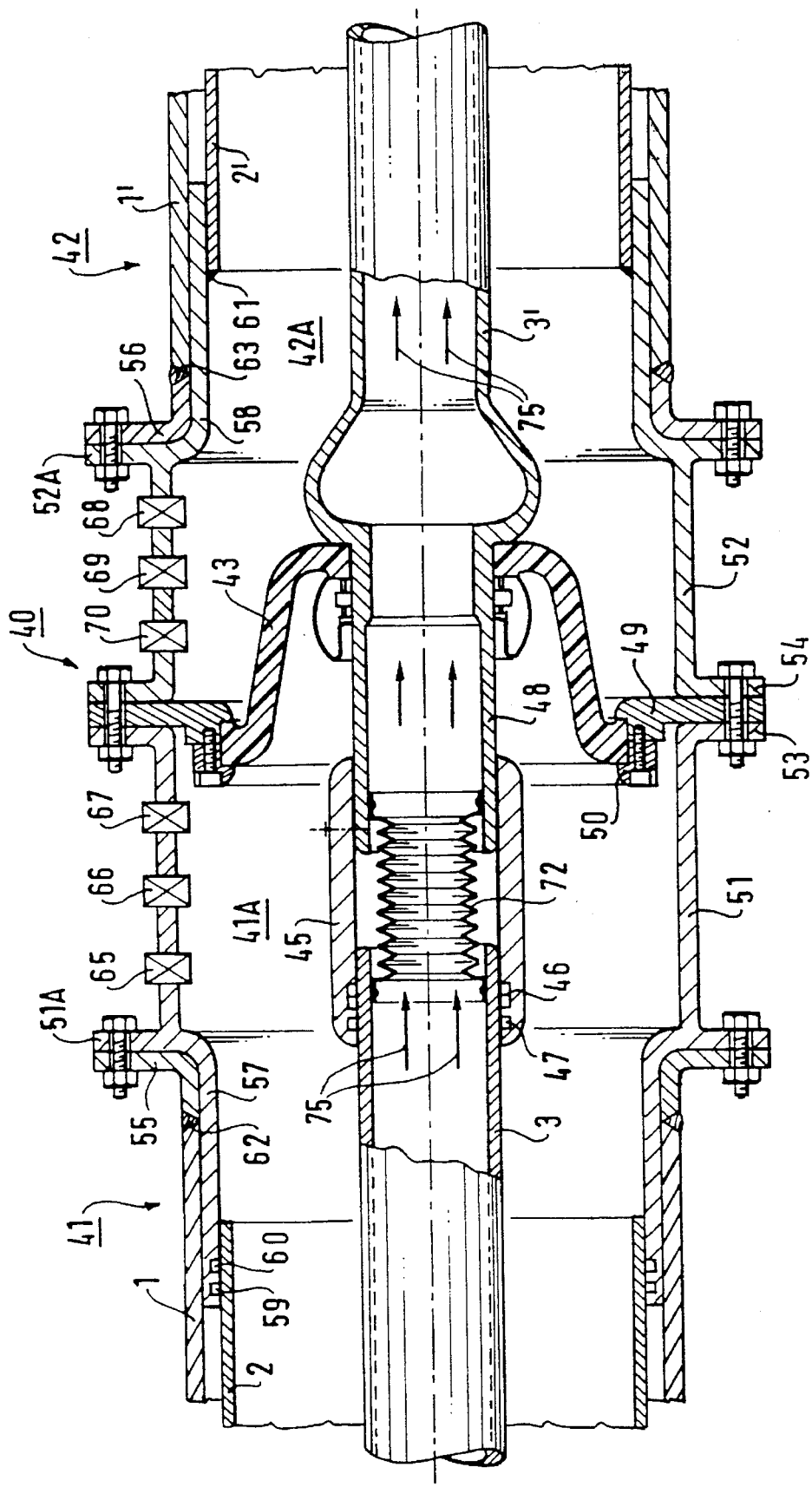
FIG. 5 is an axial section view through a coupling compartment for two lengths of electricity line and constituting a second embodiment of the invention.

FIG. 5 shows a variant embodiment of the FIG. 3 compartment, and items that are common to both figures are given the same reference numerals.

The end 71 of the tube 48 has been omitted. A gas-tight metal bellows 72 is mounted inside the contact carrier sleeve 45 connecting the conductor element 3 to the tube 48.

This makes it possible to provide communication between all of the inside volumes of the elements 3, 3', etc. of the conductor along the entire length of the line and to establish a flow 75 of fluid while nevertheless maintaining sealing, outside the conductor, between the various lengths of the line.

Circulation may be in the form of a flow of nitrogen serving to reduce heating of the conductor during a period of overloading or in summer. The pressure of the nitrogen may be the same both inside and outside the conductor (e.g. 12 hectopascals). The heated gas may be cooled outside the cable, e.g. by fan means, and then reinjected into the conductor.

Whenever the nominal current is high, it is possible to establish a flow of distilled water.

Under normal operating conditions without overloading, it is possible to keep the pressure inside and outside the conductor static.

FIG. 6 shows a variant embodiment of the FIG. 4 compartment, and items that are common to both figures are given the same reference numerals.

The end wall 71 has been omitted, and a metal or rubber bellows 72 is provided that is fixed to the contact carrier 45 at the end of the conductor 3 by means of screws 72A, and at the end 74 of the conductor 3' by means of a collar 74A. Assembly is performed as follows: the bellows is fixed to the contact carrier 45, the bellows is pulled and extended beyond the contact carrier 45, and is fixed to the end 74 of the conductor 3' by means of the collar 74A. Thereafter the conductor 3' is pushed to the left so as to position the bellows inside the space 76 defined by the contact carrier 45.

The bellows performs the same function as that described with reference to FIG. 4.

It will be observed that the couplings between lengths of line as shown in FIGS. 3 to 6 are not suitable for being dismantled. While a line is being built, such couplings that are unsuitable for being dismantled are installed about once every hundred meters, for the purpose of ensuring that the various components can expand freely without deforming in any way other than axially.

Once every 500 meters to 1500 meters, it is necessary to provide between the line lengths a coupling compartment that is suitable for being dismantled. This serves to define "sectors" each constituted by 5 to 15 hundred-meter lengths and interconnected via connection compartments that are suitable for being dismantled. One such coupling that is suitable for being dismantled is shown in FIG. 7.

The coupling is given overall reference 99 and it comprises two steel cases 100 and 101, together with two aluminum cases 102 and 103.

A first end of steel case 100 is secured by bolts 106 to a flange 104 that is welded to the end of the steel case 1 of the lefthand sector. A first end of aluminum case 102 is fixed by screws 102A to a flange 114 made of aluminum that is secured to the aluminum case 2 of the lefthand sector.

A first end of the steel case 101 is fixed by screws 107 to a flange 105 that is welded to the end of the steel case 1' of the righthand sector. A first end of the aluminum case 103 is provided with an electrical contact 103A that co-operates with the end 116 of the case 2' of the righthand sector.

The second ends of the steel cases 100 and 101 are provided with flanges that are clamped against the curved second ends of the aluminum cases 102 and 103. Clamping is provided by means of bolts 108.

The cone 109 is secured to the flange 114 by means of bolts 115. A substantially tubular part 111 provided with an end wall 111A is fixed to the end of the conductor 3 of the lefthand sector. A first end of a metal tube 110 is fixed by a screw 112 to the tube 111. The second end of the tube 110 carries a metal contact 113 that co-operates with the conductor 3' of the righthand sector.

Reference 118 designates one or more valves for venting gas. An anti-corona cap 120 provided with holes 119 for giving access to the screws 112 finishes off the equipment in the connection compartment 99.

Under steady conditions, current flows via the conductor 3, the tube 111, the tube 110, the contact 113, and the conductor 3'. Electrical continuity between aluminum case 2 and aluminum case 2' is provided by the flange 114, the case 102, the case 103, and the contact 103A.

Dismantling is performed as follows:

After the gas has been vented via the valves 118, fastenings 106, 107, 108, and 102A are undone. The cases 100 and 102 are displaced to the left while case 101 is displaced to the right. The space opened up in this way makes it possible to slide case 103 to the left. The screws 112 are now removed via the holes 119 that have been made accessible, and the tube 110 is pushed into conductor 3'. The two sectors are now separate.

FIGS. 8A to 8C show how a compartment that has been damaged by internal arcing, for example, can be removed and replaced.

As already mentioned, it is assumed that damage and pollution by dust and metal particles takes place solely within the space between two cones.

Sensors make it possible to locate accurately which compartment has been damaged, which sensors may be constituted by optical fibers. The space available between cases 1 and 2 and between cases 1' and 2' is used to house optical fibers which are themselves used as sensors or else as transmission media for conveying data along the electrical cable, and also for low voltage electrical cables that are used for powering the electronics.

FIG. 8A shows the compartment M that needs to be changed, i.e. a length of about 10 meters assuming that the length between pairs of cones is about 8 meters, for example.

A complete new compartment is prepared in the factory having a length of 10 meters for the conductor 3", about 9.5 meters for the aluminum case 2", and 9 meters of the steel case 1". It has a cone at each end. In FIG. 8A, the points defining the forthcoming positions of the end of the new compartment are marked 82', 82", 84', 84", 86', and 87.

Repair is performed as follows:

The damaged compartment is cut, e.g. at 80 and at 81. This makes it possible to begin by removing about 7 meters of the damaged compartment.

Thereafter cuts are made at 82 and at 83 through the steel cases 1 and 1' only.

This gives access to the aluminum cases 2 and 2'.

The portions of aluminum cases 2 and 2' are cut at 84 and at 85 respectively. This makes it possible to remove the damaged cones and to gain access to the conductor 3 (or 3'). Thereafter, the conductor 3 is cut at 86 and the conductor 3' is cut at 87. This makes it possible to remove the damaged compartment completely. The distance between the points 86 and 87 is 10 meters, i.e. the same as the length of the new compartment that is to be installed. The new compartment is put into place (1", 2", 3", FIG. 8B). The gaps between 82 and 82' and between 84 and 84' make it possible to weld 86 to 86' (FIG. 8B).

To avoid a rough surface state due to welding, it is possible to make use of a small ring 88.

A link part 89 previously put into place inside the aluminum case prior to the new compartment being itself put into place serves to provide electrical connection between 2 and 2" via welds 92 and 93 (FIG. 8C).

Gaskets 90 and 91 make it possible to prevent particles of metal penetrating into the enclosure while welding is being performed at 92 and at 93.

A steel link tube 94 that has previously been placed on the outside of the tube 1 serves to provide sealed closure of the compartment via welds at 95 and at 96 (FIG. 8C).

The same operations are naturally performed at the other end of the compartment.

We claim:

1. A gas-insulated single-phase cable for long-distance transport of electricity under high tension, the cable comprising a cylindrical steel case filled with nitrogen under a pressure of at least about 10 hectopascals, an aluminum- or copper-based metal conductor held axially inside the steel case by closed insulating cones, and an aluminum case disposed at a short distance from the steel case and constituting a magnetic screen protecting the steel case from a magnetic field generated by a current carried by the conductor, said steel case being separated from said aluminum case by rings made of one of a plastic material and a filled polymer, wherein each of said rings is placed in a groove in a metal collar, and two adjacent portions of the aluminum case are welded to said collar.

2. A cable according to claim 1, wherein said collar is disposed at a base of one of the closed insulating cones.

3. A cable according to claim 1, wherein the cable comprises a plurality of identical compartments each having a length in a range of about 8 to about 12 meters, each compartment including the steel case, the conductor, the insulating cones, and the aluminum case, a length of the cable comprising about 10 to 15 compartments connected together end-to-end, wherein adjacent lengths of the cable are connected together end-to-end by a connection compartment that allows the conductor and the steel and aluminum cases to expand freely without any deformation other than axial deformation, and that provides gas-tight and dust-tight sealing between the adjacent lengths, wherein said connection compartment comprises a sliding contact fixed to an end of the conductor in one of the adjacent lengths and co-operating with an end of the conductor in the other adjacent length, and another contact that is secured to an end of the aluminum case in one of the adjacent lengths and that co-operates with an end of the aluminum case in the other adjacent length, said cable further comprising a transverse plate co-operating with one of the insulating cones to provide relative sealing for the adjacent lengths.

4. A cable according to claim 3, wherein the conductors of the adjacent lengths are tubular conductors whose inside volumes are separated by closures.

5. A cable according to claim 3, wherein the cable comprises a plurality of sectors each having a length in a range of about 500 meters to about 1500 meters, wherein adjacent sectors are separated from each other by coupling compartments that are suitable for being dismantled, and wherein the coupling compartments each comprise two steel case portions that are fixed in a removable manner to ends of the steel cases of the adjacent sectors, two aluminum case portions, one of which is fixed in a removable manner to an end of the aluminum case of one of the adjacent sectors and the other of which is provided with an electrical contact co-operating with an end of the aluminum case of the other adjacent sector, said steel and aluminum case portions being secured to each other, the conductor of one of the adjacent sectors being electrically connected to the conductor of the other adjacent sector by a tube fixed in a removable manner to one of said conductors, said tube having an electrical contact that co-operates with the other conductor.

6. A cable according to claim 1, wherein optical fibers and low power, low voltage electrical cables are disposed in a space defined between the steel case and the aluminum case.

* * * * *